United States Patent [19]

Harris

[11] 4,348,950

[45] Sep. 14, 1982

[54] GARLIC PRESS

[76] Inventor: David P. Harris, 2523 S. Acoma, Denver, Colo. 80223

[21] Appl. No.: 218,077

[22] Filed: Dec. 19, 1980

Related U.S. Application Data

[63] Continuation of Ser. No. 99,429, Dec. 3, 1979, abandoned.

[51] Int. Cl.³ .............................................. B30B 9/02
[52] U.S. Cl. ....................................... 99/510; 99/495; 99/574; 100/116; 100/125; 100/213; 100/289; 241/168; 241/169.1
[58] Field of Search ................. 99/495, 501, 504, 505, 99/509, 510, 513, 568, 574; 100/116, 213, 240, 125, 289; 241/168–169.2

[56] References Cited

U.S. PATENT DOCUMENTS

| 659,822 | 10/1900 | Moore | 241/169.1 |
| 761,860 | 6/1904 | Taylor | 100/125 |
| 782,618 | 2/1905 | Minyard | 100/125 |
| 926,327 | 6/1909 | Hoffman | 241/168 |
| 2,602,596 | 7/1952 | Jones et al. | 99/574 |

Primary Examiner—Philip R. Coe
Assistant Examiner—Timothy F. Simone
Attorney, Agent, or Firm—Ralph F. Crandell

[57] ABSTRACT

A garlic press with a cylindrical outer shell having a large open top end and a slightly smaller open bottom end. The botton end supports a foraminous plate onto which is placed the herb, such as garlic, which is to be crushed for juice. An inner cylindrical ram is integrally connected to a cap portion, which cap portion threads onto the outside of the larger open end of the outer shell. The ram is grooved with radial slots which contact the herb to be crushed and cooperate with holes in the foraminous plate to extract juice from the herb.

6 Claims, 6 Drawing Figures

GARLIC PRESS

CROSS-REFERENCE TO RELATED APPLICATIONS

This application is a continuation of U.S. patent application Ser. No. 99,429, filed Dec. 3, 1979, abandoned.

BACKGROUND OF THE INVENTION

1. Field of the Invention

This invention relates to presses for crushing herbs and the like to obtain the juice and pulp, and more particularly to herb presses which maximize the surface contact of a grinding surface with the herb in order that the maximum amount of juices and pulp can be extracted by expelling the juices and pulp through the press in the direction of the force applied to the herb or garlic.

2. Description of the Prior Art

Garlic presses are well known in concept. Heretofore the garlic presses known have been based on the principle of a nut cracker. A bowl is adapted to contain the herb or garlic to be crushed. A transverse screw with a flattened end is threadably received through a wall of the bowl. As the screw advances the contents of the bowl are put under increasing pressure forcing the juices out of the solid particles and crushing or pulverizing the herb. The juices and fiber of the herb can then be poured from the bowl for use in cooking.

Some drawbacks are apparent in such a garlic press. It is first of all difficult to crush all of the herb or garlic with one passage of the screw. This means that the screw must be withdrawn slightly and the garlic or herb placed in the path of the screw and another cycle repeated.

In crushing or pulverizing the garlic or herb, the prior art cannot efficiently utilize the force of the screw for disrupting the herb fiber. The herb or garlic is squeezed between the wall of the bowl and the screw. It is therefore more difficult to separate, or disrupt the fiber into distinct smaller particles. The screw and bowl combination cannot crush the herb to a predetermined size because there is very little grinding, just squeezing of the herb.

OBJECTS AND SUMMARY OF THE INVENTION

The principal object of the present invention is to provide an improved press for crushing herbs or garlic to obtain juice and pulp.

A related object of the present invention is to provide an improved press for extracting juice and pulp from herbs or garlic that extracts the maximum available juice and pulp content from the material to be ground.

Another object of the present invention is to provide a press of the foregoing character for pulverizing herbs or garlic to a preselected range of particle size.

A further object of the present invention is to provide an improved, relatively inexpensive, light-weight and easy-to-use apparatus for extracting juices from garlic or herbs.

In accordance with the objects of the present invention, an outer cylindrical shell having two open ends, a larger upper end and a smaller lower end, receives a ram having a grinding surface with radially extending grooves at the bottom or first received end of the ram. The bottom or grinding surface of the ram is convex downwardly toward the smaller open end of the outer shell. The ram with its grooved surface is mated to an upwardly concave foraminous screen or plate supported within the open bottom end of the shell and having a plurality of openings defined throughout its surface. The screen or plate is supported by and retained on a short inwardly and upwardly turned shoulder at the bottom open end of the outer shell.

The ram, which is hollow for light weight, has an outwardly protruding cap at its upper end which extends outwardly a short distance and depends downwardly over the exterior surface of the upper end of the outer shell. The depending portion of the cap is internally threaded so as to be received by external threads on the upper end of the outer shell.

In this manner, the capped end of the ram is threadably engaged onto the upper end of the outer shell. As the cap is turned, the ram telescopes within the outer shell toward ultimate contact with the plate or screen. Herbs or garlic placed upon the foraminous plate are thoroughly ground by the rotating action of the ram and the squeezing impingement of the herb on the openings of the screen or plate. The foraminous plate allows the juice and pulp or fiber to be expelled out the bottom opening of the outer shell and collected for later use.

DESCRIPTION OF THE PREFERRED EMBODIMENT

Figure 1:
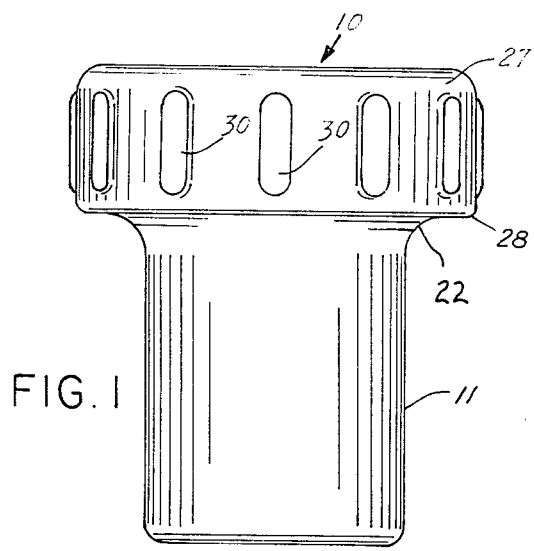
FIG. 1 is an elevation view of the present invention.
Figure 2:
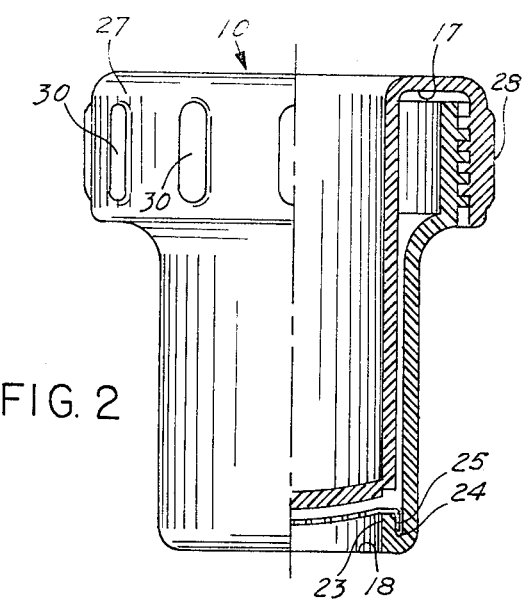
FIG. 2 is a half section elevation view of the invention as shown in FIG. 1.
Figure 3:
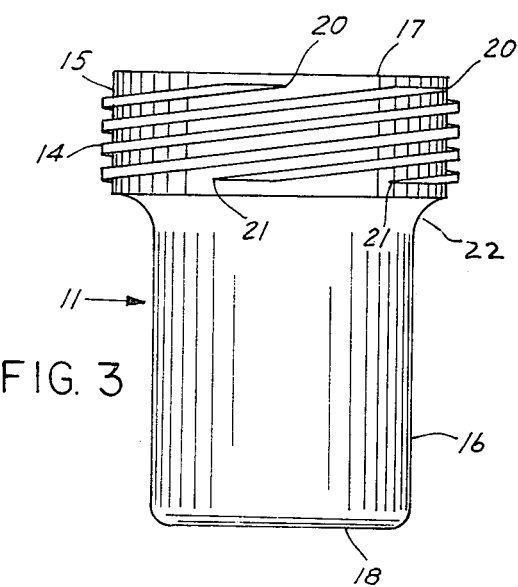
FIG. 3 is an elevation view of the outer shell of the invention.
Figure 4:
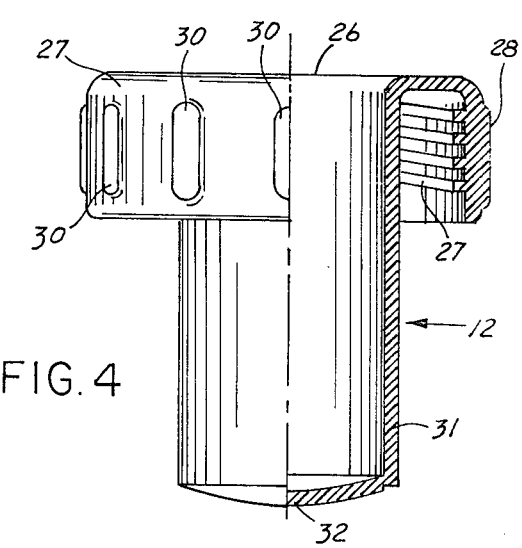
FIG. 4 is a half section view of the ram and capped portion of the invention.
Figure 5:
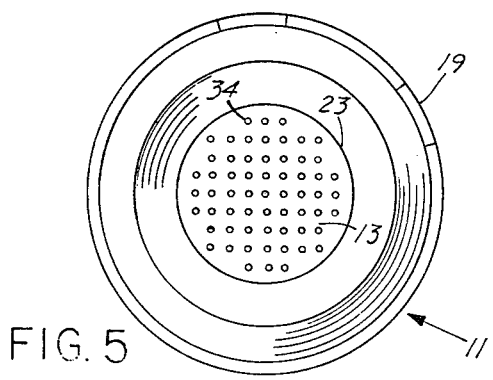
FIG. 5 is a bottom plan view of the outer shell shown in FIG. 3.
Figure 6:
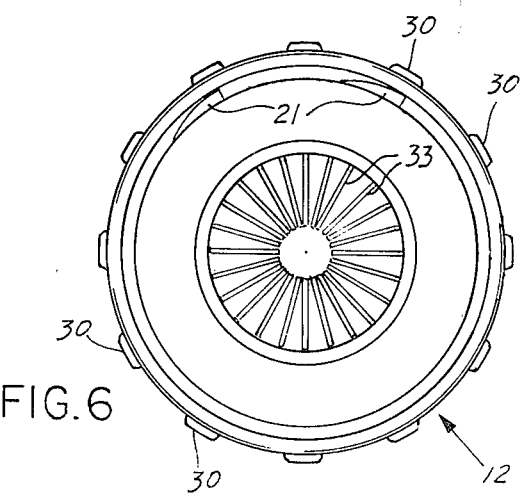
FIG. 6 is a bottom plan view of the ram and cap shown in FIG. 4.

A garlic press 10 for extracting and comminuting cloves of garlic or the like is shown in FIGS. 1 and 2 and is composed of three main integral parts. An outer shell or cup 11 is shown in FIGS. 3 and 5 and is of generally hollow cylindrical configuration. Telescopingly received within the outer shell 11 is a ram 12, also of hollow cylindrical configuration. At the point of the deepest penetration of the ram into the outer shell, there is provided a formainous plate or screen 13, releasably connected to the outer shell 11 in a manner to be discussed more fully hereinafter. Though generally cylindrical, the outer shell 11 has an upper or top portion 15 that is of slightly larger diameter than a lower or bottom portion 16 of the outer shell, a fillet or radius 22 is disposed between upper portion 15 and lower portion 16. As can be seen in FIG. 3, the lower portion extends the greater percentage of the height of the outer shell than does the upper portion 15. The upper or top portion 15 of the outer shell 11 has an upper circular opening 17 of slightly larger diameter than a bottom circular opening 18 in the outer shell 11.

External threads 19 are continuously run from a start position 20 on the upper portion 15 downward to a point adjacent the filet 22 where the lower portion 16 of the outer shell 11 commences. These external threads 19 are double, being formed by two threads giving two start positions 20 and two end positions 21, as seen in FIG. 3.

At the lower portion 16 of the outer shell 11 is disposed a relatively short upwardly turned shoulder 23. The shoulder 23 extends circumferentially around the bottom opening 18. The shoulder is inturned from the outer shell leaving an annular groove or small toroidal channel 24 between the shoulder and outer shell.

The screen or foraminous plate 13 is adapted to drop into the outer shell 11 through the upper open end 17 and rest on the circumferential shoulder 23. A downwardly extending peripheral flange or lip 25 surrounds the perimeter of the foraminous plate 13 and is adapted to fit into the toroidal channel 24. Thus, once the foraminous plate 13 is fitted onto the shoulder 23, the foraminous plate can be removed at any time for cleaning. The foraminous plate 13 is ideally of concave shape so that the herb or garlic tends to stay on the middle of the plate. In an alternative embodiment the plate 13 is dropped to a position where the shoulder 23 forms a wall around the plate 13.

The ram 12 is generally of cylindrical configuration. A cap or outward flange 27 extends radially away from the upper end of the ram. The cap is integrally connected to the ram, leaving a ram opening 26 at the point where the cap 27 extends outwardly. A short distance away from the ram 12 the cap descends in a depending portion or skirt 28 of roughly the same longitudinal dimension as the upper portion 15 of the outer shell 11. Double internal threads 29 extend downwardly along the length of the depending skirt 28, matching external threads 19 on the outer shell 11. External to the depending skirt 28 are disposed at equal arcuate segments raised ribs 30 to facilitate rotation of the cap 27 and integral ram 12.

A lower ram end 31 is a cylindrical body of constant transverse cross-section as one moves away from the cap 27. The lower end 31 terminates in a grinding surface 32. The grinding surface is convex in the downward direction, or the direction that the ram 12 moves relative to the outer shell 11 as the ram is threaded onto the outer shell by interconnecting the double external threads 19 and double internal threads 29. The grinding surface 32 has radially extending grooves 33 covering substantially the entire grinding surface area. It will be understood that the foraminous plate 13 has openings 34 covering substantially its entire surface area.

The press 10 is used by placing the foraminous plate 13 onto the shoulder 23 of the outer shell 11. Whatever herbs, such as garlic, to be crushed or pulverized, are placed on the plate. The ram 12 is inserted into the upper open end 17 of the outer shell. The external threads 19 of the outer shell threadably engage the internal threads 29 of the cap 27 portion of the ram 12. As the cap 27 is turned the ram 12 descends within the outer shell 11. The grinding surface 32, with its grooves 33, contacts the herb or garlic, rotates the garlic against the plate and compresses it downwardly. The foraminous plate 13 can flex and aid the grinding of the herb or garlic. The juice and pulp or herb fiber is forced through the openings 34. Additionally the grooves 33 and openings 34 in the plate 13 tend to disrupt the fiber of the herb or garlic and efficiently extract the juice and pulp.

As the ram 12 rotatably descends, the juices of the herb or garlic are forced in the direction of the ram's descent through the openings 34 in the plate 13 into a measuring cup or other receiving container. The plate 13 can be interchanged for another with different sized openings 34. Variation of the size of the openings 34 of the plate 13 can therefore serve to change the size of the pulp particles, which when added to a recipe, can selectively enhance the flavor from the garlic or herb.

The force available is therefore maximized onto the plate 13. The plate, being of metal, flexes and helps the grinding action. The mating shape of the grinding surface 32 and the plate 13 make the interface between the two a particularly efficient area where herbs can be crushed.

The entire device is readily washable. The foraminous plate 13 is removable from the shoulder 23, again easing cleaning of the press 10, and allowing for interchangeable plates 13 having different sizes and configuration of openings 34.

While an illustrative embodiment of the present invention has been shown in the drawings and described above in considerable detail, it should be understood that there is no intention to limit the invention to the specific form disclosed. On the contrary, the intention is to cover all modifications, alternative constructions and processes, equivalents and uses falling within the spirit and scope of the invention as expresed in the appended claims.

What is claimed is:

1. A press for crushing herbs or the like comprising:

a rigid generally hollow cylindrical outer shell having a bottom portion defining a bottom opening and an enlarged externally threaded top portion defining a top opening of relatively larger diameter than said bottom opening, said top portion being integrally connected through a radius to said bottom portion;

a circumferential shoulder integrally connected to the bottom portion of said cylindrical outer shell, said shoulder being spaced from the interior surface of the bottom portion of the outer shell, said shoulder extending a relatively short distance upward from the bottom portion toward the top portion of said outer shell and defining an interior channel within said bottom portion;

a foraminous plate releasably connected to said shoulder by a downwardly extending peripheral flange extending downwardly into said channel;

a hollow cylindrical ram telescopingly received within the interior of said outer shell, a grinding surface defined on the circular bottom portion of said cylindrical ram, said grinding surface including shallow radially extending grooves over the surface thereof, said grinding surface having a diameter smaller than said circumferential shoulder and substantially equal to the diameter of the cylindrical ram; and a cap integrally connected to and extending radially outward from the top of said cylindrical ram and having a depending skirt portion extending downwardly over the enlarged threaded top portion of said outer shell, said depending skirt portion further having raised ribs at equal arcuate locations around said cap and being internally threaded for threaded engagement with said threaded top portion of said shell, whereby an herb placed on the foraminous plate is crushed between said plate and the descending grinding surface of said ram as said cap is turned and juices contained in the herb are thereby squeezed out through the foraminous plate and the open bottom of said outer shell.

2. A press for crushing herbs or the like comprising:

a rigid generally hollow cylindrical outer shell having a bottom portion defining a bottom opening and an enlarged externally threaded top portion defining a top opening of relatively larger diameter than said bottom opening;

a circumferential shoulder integrally connected to the bottom portion of said cylindrical outer shell, said shoulder being spaced from the interior of the bottom portion of said outer shell, said shoulder extending a relatively short distance upward from the bottom portion toward the top portion of said outer shell and defining an interior channel within said bottom portion;

a foraminous plate having a concave shape toward the bottom portion of said outer shell, said plate releasably connected to said shoulder by a downwardly extending peripheral flange extending into said channel, said plate further being concave toward the bottom portion of said outer shell;

a hollow cylindrical ram telescopingly received within the interior of said outer shell, a grinding surface defined on the circular bottom portion of said cylindrical ram, said grinding surface including shallow radially extending grooves, said grinding surface further being convex toward the bottom portion of said outer shell to conform with the concave shape of said foraminous plate, said convex grinding surface having a diameter smaller than said circumferential shoulder and substantially equal to the diameter of the cylindrical ram; and a cap integrally connected to and extending radially outward from the top of said ram, said cap further depending downwardly over the top portion of said outer shell and the cap further having raised ribs at equal arcuate locations around said cap and internal threads whereby said integrally connected ram is threadably connected to said outer shell whereby an herb placed on the foraminous plate is crushed between said plate and the descending grinding surface of said ram as said cap is turned and juices contained in the herb are squeezed out through said foraminous plate and the open bottom of said outer shell.

3. A press for crushing herbs or the like comprising:

a rigid generally hollow cylindrical shell having a bottom portion defining a bottom opening and an enlarged externally threaded top portion defining a top portion integrally connected to said open bottom portion through a circumferential radius, said top portion being of larger diameter relative than said open bottom portion;

a circumferential shoulder integrally connected to the bottom portion of said cylindrical outer shell, said circumferential shoulder extending towards the top portion of said shell and spaced from the interior surface of the bottom portion of the outer shell to define an interior channel within said bottom portion;

a concave foraminous plate releasably supported on said shoulder and having a downwardly extending peripheral flange extending into said channel, said plate being supported at a predetermined distance below said shoulder to thereby retain said herbs centrally of said shoulder;

a hollow cylindrical ram telescopingly received within the interior of said outer shell and having a convex grinding surface on the bottom portion thereof, said grinding surface defining a plurality of shallow radially extending grooves and having a diameter smaller than said circumferential shoulder; and an enlarged gripping cap integrally connected to the top of said ram and extending radially outwardly therefrom and depending downwardly over the top portion of said outer shell, said cap including internal threads adapted to threadably engage the threads on the large diameter top portion, whereby an herb placed on the foraminous plate is crushed between said plate and the descending grinding surface of said ram as said cap is turned and juices contained in the herb are squeezed out through said foraminous plate and the open bottom of said outer shell.

4. An extraction and comminuting device as defined in claim 3, including means on the exterior surface of said skirt for facilitating gripping thereof by a user to rotate said ram relative to said cup.

5. An extraction and comminuting device as defined in claim 3, including a plurality of protruding ribs on the exterior surface of said skirt.

6. An extraction and comminuting device comprising, in combination, an open-ended cup having a diametrically enlarged upper portion and a lower portion defining an outlet opening, means defining external threads on said enlarged upper portion, means on said lower portion defining an inturned shoulder, said shoulder defining an internal annular groove adjacent the lower portion of said cup, a concave foraminous plate removably supported on said shoulder, said plate having a downturned lip portion received within said internal annular groove for supporting and removably retaining said plate within the lower portion of said cup, a ram having a hollow cylindrical body telescopingly received within said cup and defining a convex surface on its lower end, an outwardly extending flange integral with the upper end of said body, said flange including a depending skirt spaced from said ram body and having internal threads adapted for threadable engagement with the external threads on said cup, means on said convex lower end surface of said ram body for engaging and grinding an object supported on said foraminous plate as said ram is rotated, said threads providing a telescoping driving force between said convex surface and said concave plate for squeezing said object therebetween, and means on the exterior surface of said skirt for facilitating gripping thereof by a user to rotate said ram relative to said cup.

* * * * *